Oct. 28, 1930.   F. J. OVEN   1,779,616
GASKET
Original Filed July 6, 1926

Inventor
Frank J. Oven
Daniel Brennan
Attorney

Patented Oct. 28, 1930

1,779,616

UNITED STATES PATENT OFFICE

FRANK J. OVEN, OF CHICAGO, ILLINOIS, ASSIGNOR TO VICTOR MANUFACTURING & GASKET CO., A CORPORATION OF ILLINOIS

GASKET

Original application filed July 6, 1926, Serial No. 120,775. Divided and this application filed December 22, 1927. Serial No. 241,895.

The present invention relates to improvements in gaskets, and has particular reference to gaskets of the type disclosed in my copending application Serial No. 120,775, filed July 6, 1926, of which this application is a division.

Gaskets of this type commonly comprise two outer layers of relatively thin sheet metal, and a resilient layer of non-metallic and preferably refractory material interposed and confined between the outer layers, the intermediate layer making the gasket flexible and resilient so as to ensure a tight seal. In many instances, gaskets of this character have a series of spaced openings adapted to be placed in registration with the cylinder openings of an internal combustion engine, and have one of the outer layers provided with flanges which extend through the apertures and into overlapping engagement with the peripheral margins of the other outer layer so as to hold the parts securely in assembled relation. In use, the walls about the apertures are exposed to the hot gases passing therethrough, and in general to severe conditions tending to reduce the efficiency and life of the gasket. The primary object of the present invention, therefore, resides in the provision of a novel gasket having means for reinforcing and protecting the closed margins of the gasket so as to increase the efficiency and life of the gasket.

A further object of the invention is to provide a new and improved gasket of the above character in which the reinforcing means does not increase the thickness of the gasket.

Further objects and advantages will become apparent as the description proceeds.

Figure 1:
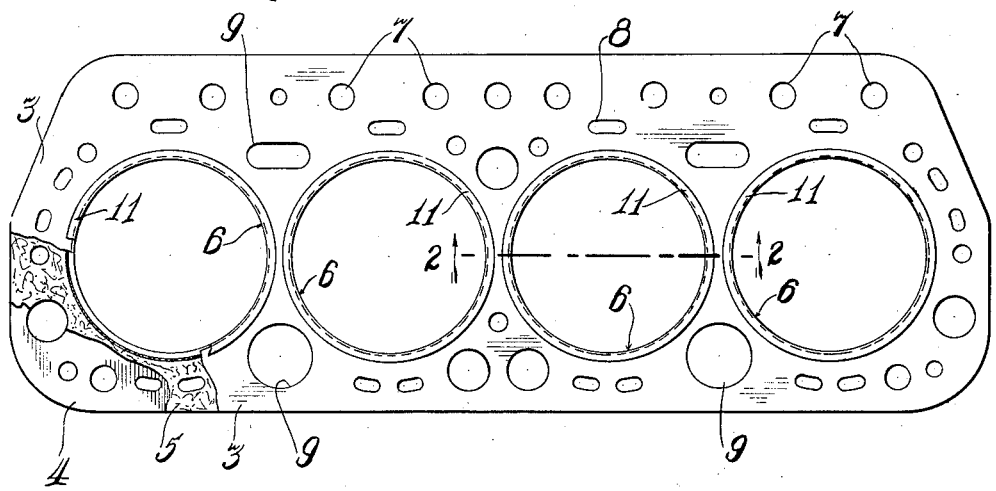

In the accompanying drawings, Figure 1 is a plan view of a gasket embodying the features of my invention, part being broken away to show the interior.

Figure 2:
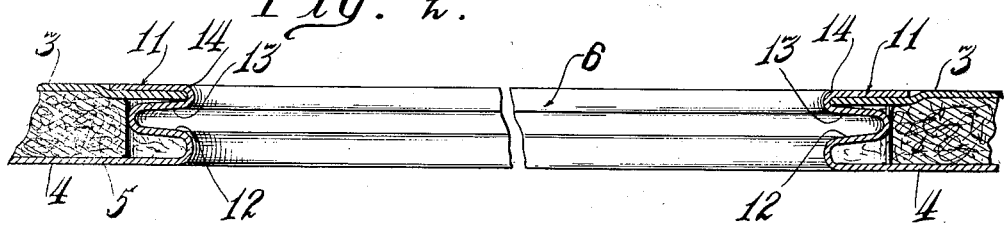

Figure 2 is a fragmentary sectional view taken along line 2—2 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative forms falling within the spirit and scope of the invention as expressed in the appended claims.

Referring more particularly to the exemplary embodiment of the invention, the gasket comprises two outer layers 3 and 4 of thin sheet metal, such as bronze. Interposed between the outer layers 3 and 4 is a layer of suitable refractory material 5, such as asbestos, which is flexible or yieldable. In the present instance, the gasket is intended for use between the body and the cylinder head of an internal combustion engine, and to this end the layers 3, 4 and 5 are formed with a series of coincident openings 6 adapted to be placed in registration with the cylinders of the engine. A plurality of smaller coincident openings 7, 8, 9 and 10 are also provided respectively for the attaching bolts, for the passages in the cooling jacket, and for the inlet and outlet passages to and from the manifold, the parts of the engine referred to herein not being shown in the drawing.

The layers 3, 4 and 5 may be held together in assembled relation in any suitable manner, and in the present instance are secured together only about the openings 6. Preferably the layer 3 projects beyond the edge of the layer 5, and the layer 4 has a marginal flange 11 which also projects beyond the edge of the layer 5, and which is then bent into overlapping relation with the marginal edge of the layer 3 to hold the parts securely in assembled relation. The underlapping margin of the layer 3 is depressed slightly below the general plane of the said layer and into the material 5 a distance equal to the thickness of the flange 11 so as to provide a gasket of uniform thickness. The overall thickness at the edges of the openings 6 thus is not increased in spite of the provision for three layers of sheet metal at said edges.

A reinforcement is provided at the peripheral walls of the openings 6, these being the areas exposed to the severest conditions.

This reinforcement is provided by corrugating or folding the flange 11.

Preferably the flange 11 is formed with three folds 12, 13 and 14, of which the fold 14 embraces the margin of the layer 3, and of which the folds 12 and 13 extend inwardly between the projecting margins of the layers 3 and 4 substantially to the edge of the refractory layer 5. By reason of this construction, those parts of the gasket most exposed to the attack of hot gases are reinforced and strengthened. At the same time, the folds may be compressed together when subjected to pressure, thus not destroying the resiliency of the gasket at the peripheral edges of the openings 6 where it is most needed. It will be evident that I have provided a highly advantageous and novel gasket which is efficient and relatively long lived, and which is simple and inexpensive in construction.

I claim:

1. A gasket having, in combination, two outer layers, a resilient core disposed between said layers, said layers and core having coincident openings and said layers provided with engaging means in the general plane of one of said layers, and means forming a peripheral wall about said openings and enclosing the adjacent edge of said core, said wall being folded between said outer layers to provide a reinforcement, the sides of the folds being spaced.

2. A gasket comprising two outer metallic layers and an intermediate layer of refractory material, having registering openings, one of the metallic layers being formed with a triple curve the central bend or wall of which lies in contact with the wall of the opening in said refractory layer, the adjacent edge of the other metallic layer being disposed in the adjacent bend of the said curve of the other first-mentioned metallic layer and in contact with the inner face of the terminal portion thereof.

3. A gasket having an opening therein and comprising outer metal layers and an interposed layer of heat-resisting material, the marginal edges of the metal layers projecting inwardly beyond the edge of the heat-resisting layer at the opening, one of said marginal edges being extended through the opening and overlapping the other marginal edge and forming an enclosed space about the edge of the heat-resisting material at the opening, said extended marginal edge being folded and extended into said enclosed space.

4. A gasket having an opening therein and comprising outer metal layers and an interposed layer of heat-resisting material, the marginal edges of the metal layers projecting inwardly beyond the edge of the heat-resisting layer at the opening, one of said marginal edges being extended through the opening and overlapping the other marginal edge and forming an enclosed space about the edge of the heat-resisting material at the opening, that portion of said extended marginal edge forming the wall of said opening being folded laterally within said enclosed space to form a groove communicating with said opening.

5. A gasket having an opening therein and comprising outer metal layers and an interposed layer of heat-resisting material, the marginal edges of the metal layers projecting inwardly beyond the edge of the heat-resisting layer at the opening, one of said marginal edges being depressed and the other marginal edge being extended through said opening and overlapping said depressed marginal edge on one side of the gasket, said extended marginal edge having an intermediate fold extending laterally of the opening and abutting the edge of the heat-resisting material at said opening.

In testimony whereof I affix my signature at 10 South La Salle Street, Chicago, Illinois.

FRANK J. OVEN.